United States Patent
Pasquini et al.

(10) Patent No.: US 6,615,946 B2
(45) Date of Patent: *Sep. 9, 2003

(54) POWER PLANT FOR ELECTRIC EARTH-MOVING AND AGRICULTURAL VEHICLES WITH FOUR-WHEEL DRIVE

(75) Inventors: Paolo Pasquini, Bologna (IT);
Giacomina Venieri, Viale Orsini, 9/1, 48022 Lugo (IT)

(73) Assignees: VF Venieri S.p.A., Lugo (IT);
Giacomina Venieri, Lugo (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/507,729

(22) Filed: Feb. 22, 2000

(65) Prior Publication Data

US 2002/0074177 A1 Jun. 20, 2002

(30) Foreign Application Priority Data

Feb. 24, 1999 (IT) .......................................... BO99A0077

(51) Int. Cl.⁷ ............................................. B60K 17/344
(52) U.S. Cl. ...................... 180/248; 180/233; 180/65.1; 180/65.6
(58) Field of Search ................................ 180/235, 53.5, 180/65.1, 233, 234, 242, 244, 245, 247, 248, 252, 253, 65.6, 246, 336; 188/71.5, 77 R, 77 W, 26, 28; 192/13 R, 219.4, 219.6; 477/2

(56) References Cited

U.S. PATENT DOCUMENTS

| | | | | |
|---|---|---|---|---|
| 1,254,057 A | * | 1/1918 | Moore ...................... 180/6.48 |
| 2,944,830 A | | 7/1960 | Veron |
| 3,771,032 A | * | 11/1973 | Hender ........................... 318/8 |
| 3,799,284 A | * | 3/1974 | Hender ........................ 180/65 |
| 4,233,858 A | * | 11/1980 | Rowlett ........................ 74/675 |
| 4,318,450 A | * | 3/1982 | Griesenbrock .............. 180/212 |
| 4,363,999 A | * | 12/1982 | Preikschat .................... 318/53 |
| 4,470,476 A | * | 9/1984 | Hunt .......................... 180/65.2 |
| 4,662,472 A | * | 5/1987 | Christianson et al. ........ 180/235 |
| 4,883,138 A | * | 11/1989 | Kameda et al. ............. 180/249 |
| 5,028,828 A | * | 7/1991 | Felkai et al. ............... 244/75 R |
| 5,188,193 A | * | 2/1993 | Schroeder .................... 180/242 |
| 5,379,857 A | * | 1/1995 | Niederhofer ................. 180/248 |
| 5,419,406 A | * | 5/1995 | Kawamoto et al. ......... 180/65.6 |
| 5,680,908 A | * | 10/1997 | Reed .......................... 180/65.3 |
| 5,704,440 A | * | 1/1998 | Urban et al. ................ 180/65.2 |
| 6,005,358 A | * | 12/1999 | Radev .......................... 318/139 |
| 6,041,877 A | * | 3/2000 | Yamada et al. ............. 180/65.2 |
| 6,119,819 A | * | 9/2000 | Von Kaler ................... 188/71.5 |
| 6,306,056 B1 | * | 10/2001 | Moore ............................... 475/5 |
| 6,401,849 B1 | * | 6/2002 | Seguchi et al. ............. 180/65.6 |
| 2002/0109357 A1 | * | 8/2002 | Lilley et al. ............... 290/40 C |

FOREIGN PATENT DOCUMENTS

| | | | |
|---|---|---|---|
| DE | 43 20 911 | | 12/1994 |
| FR | 2663591 | * | 12/1991 |
| GB | 2322345 A | * | 8/1998 |
| WO | 98 45928 | | 10/1998 |

* cited by examiner

Primary Examiner—Lesley D. Morris
Assistant Examiner—Daniel Yeagley
(74) Attorney, Agent, or Firm—Guido Modiano; Albert Josif; Daniel O'Byrne

(57) ABSTRACT

A power plant for electric earth-moving and agricultural vehicles with four-wheel drive which comprises a supporting chassis, an electric motor drive for driving wheels of the vehicle; the motor drive comprises a gear-type reduction and distribution unit which is installed in a housing which is rigidly coupled to the chassis, at least two electric motors whose body is fixed to the housing, a front longitudinal distribution shaft and a rear longitudinal distribution shaft which protrude from the housing, two differentials which are fitted at the ends of the distribution shafts and from which a front axle and a rear axle respectively protrude for respective pairs of driving wheels, at least one of the axles being provided with steering elements; and an assembly for an oscillating support of the front axle which is fixed, in a downward region, to a front end of the supporting chassis.

8 Claims, 4 Drawing Sheets

POWER PLANT FOR ELECTRIC EARTH-MOVING AND AGRICULTURAL VEHICLES WITH FOUR-WHEEL DRIVE

BACKGROUND OF THE INVENTION

The present invention relates to a power plant for electric earth-moving and agricultural vehicles with four-wheel drive.

Vehicles with a hydraulic drive controlled by a pump which is driven by an internal-combustion engine are also known for earth-moving and agricultural work: in particular, some vehicles can be fitted, at the front or at the rear, with buckets, loading shovels, blades, lifting forks, excavators, mills, drills, rotating brushes or equipment of any kind which is actuated hydraulically. Power plants for vehicles of this type are extremely effective, but when used in enclosed spaces, such as mines, basements, ship holds, industrial buildings, historical city centers, cemeteries or the like, they have the drawback that their internal-combustion engines emit exhaust gases and produce noise at levels which are particularly unwanted in such environments.

In practice, there is the need for vehicles which reduce the coefficients of acoustic and chemical aggressiveness and which in giving broad assurances of environment-friendliness have a gentle impact on the user and on the citizens involved.

On the other hand, differently from battery-powered electric-drive vehicles known as fork-lift trucks, which are meant to usually work on level ground and on the same site, earth-moving vehicles must be able to travel for significant stretches on roads, including unpaved roads, without stations for recharging or replacing the batteries.

SUMMARY OF THE INVENTION

The aim of the present invention is to provide a power plant for electric earth-moving and agricultural vehicles with four-wheel drive which can travel over significant distances on roads, can operate without emitting toxic gases, can be fitted with equipment of any kind which can be actuated hydraulically and has a significant operating range.

Within the scope of this aim, an object of the present invention is to provide a structure which is simple, relatively easy to provide in practice, safe in use, effective in operation and relatively modest in cost.

This aim, this object and others which will become apparent hereinafter are achieved by a power plant for electric earth-moving and agricultural vehicles with four-wheel drive according to the present invention, characterized in that it comprises a supporting chassis, an electric motor drive for the driving wheels of the vehicle which comprises a gear-type reduction and distribution unit which is installed in a housing which is rigidly coupled to said chassis, at least two electric motors whose body is fixed to said housing, a front longitudinal distribution shaft and a rear longitudinal distribution shaft which protrude from said housing, two differentials which are fitted at the ends of said distribution shafts and from which a front axle and a rear axle respectively protrude for respective pairs of driving wheels, at least one of said axles being provided with steering elements, and an assembly for the oscillating support of said front axle which is fixed, in a downward region, to the front end of said supporting chassis.

BRIEF DESCRIPTION OF THE DRAWINGS

Further characteristics and advantages of the present invention will become apparent from the following detailed description of a preferred but not exclusive embodiment of a power plant for electric earth-moving and agricultural vehicles with four-wheel drive according to the invention, illustrated only by way of non-limitative example in the accompanying drawings, wherein.

DESCRIPTION OF THE PREFERRED EMBODIMENTS

Figure 1:
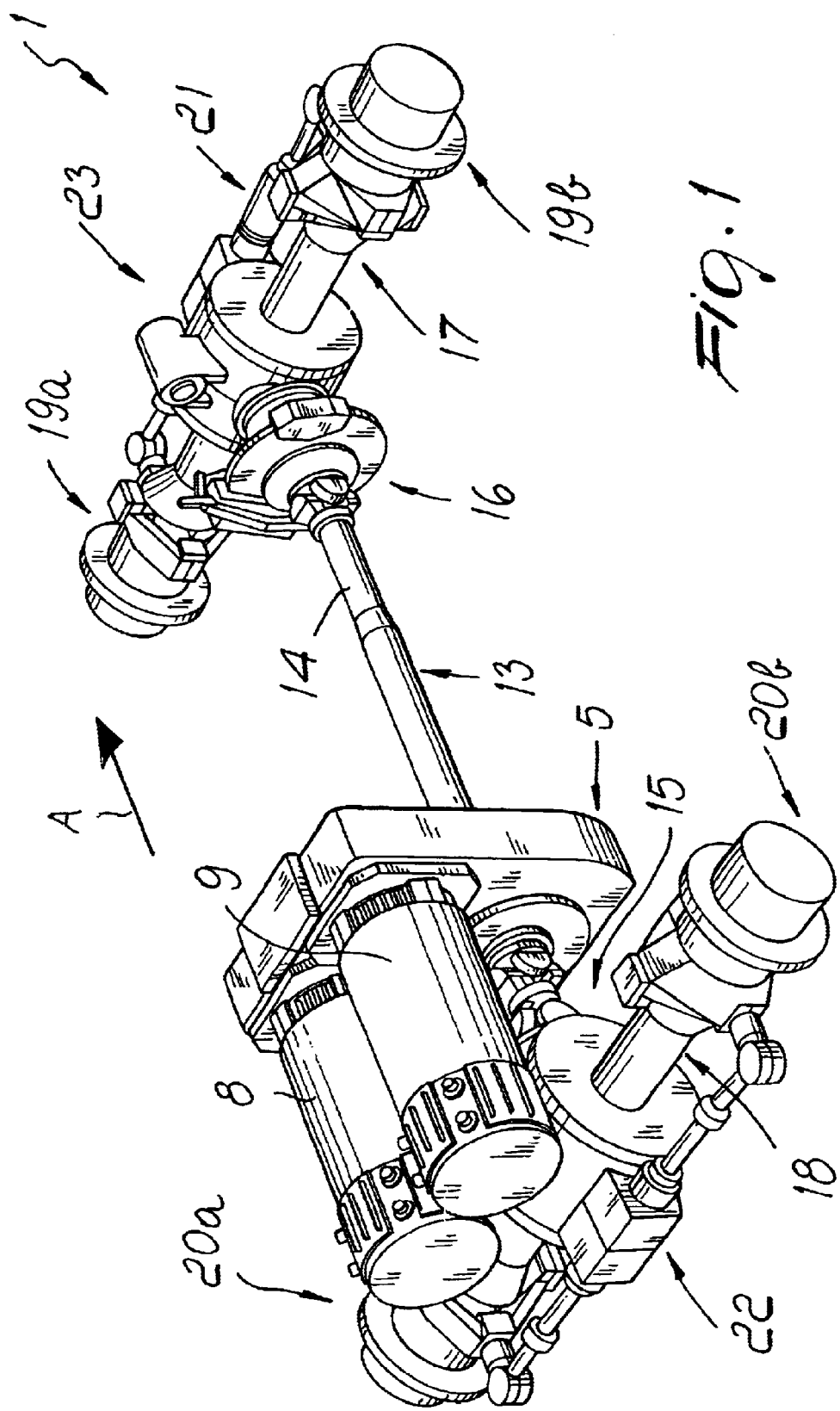
FIG. 1 is a schematic perspective view of the power plant for electric earth-moving and agricultural vehicles with four-wheel drive according to the invention.
Figure 2:
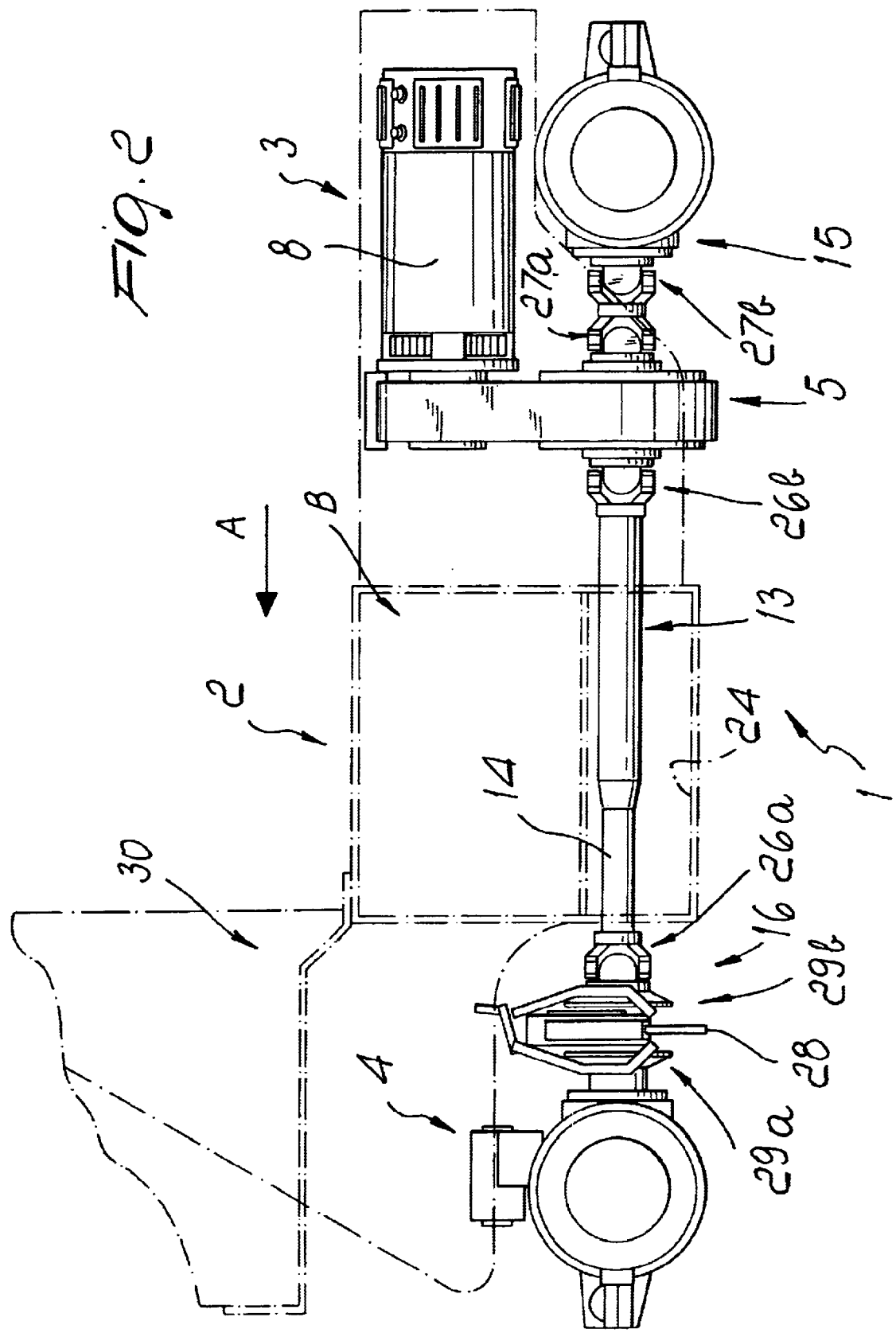
FIG. 2 is side view of the power plant.
Figure 3:
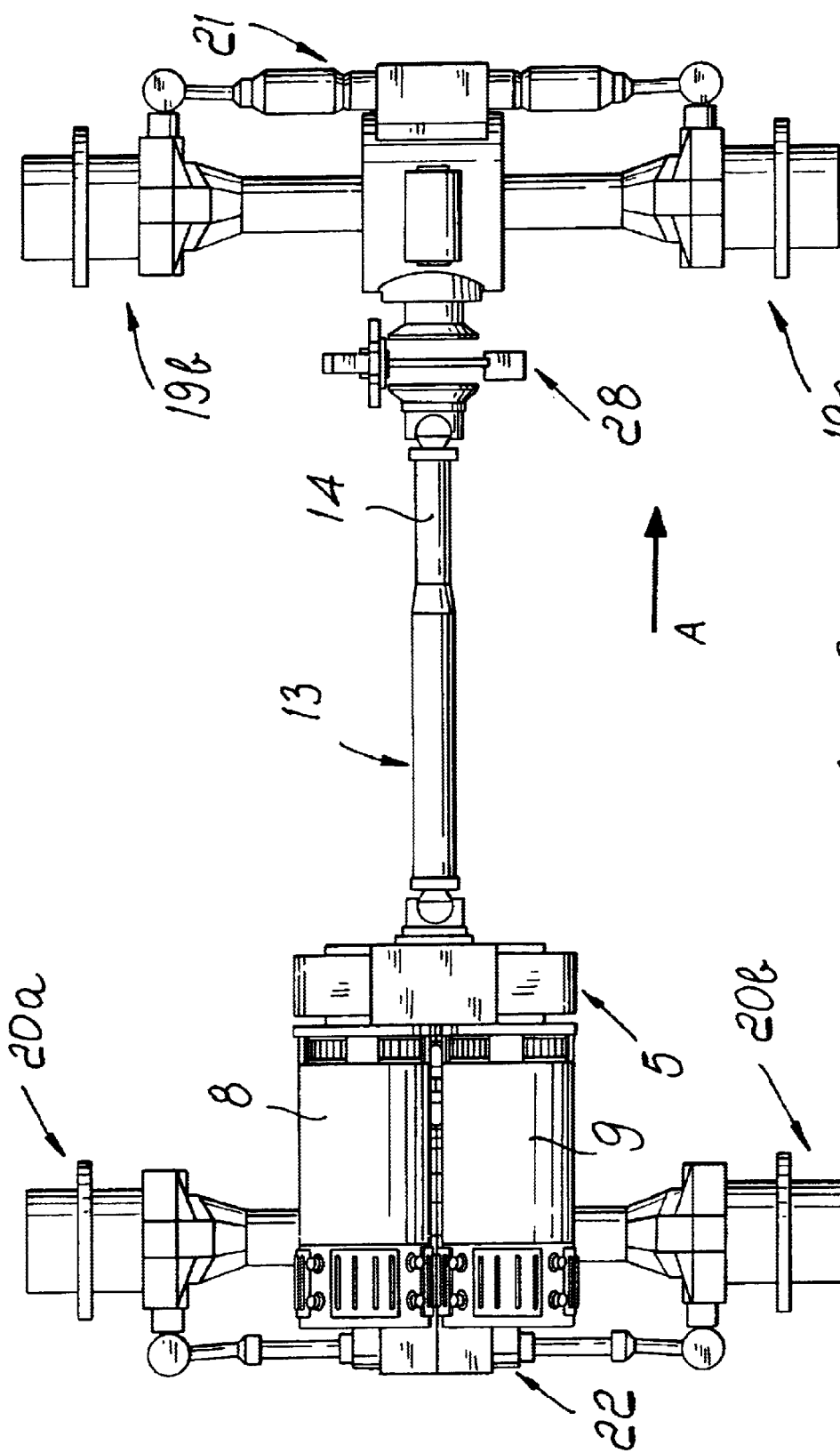
FIG. 3 is a top view of the power plant.
Figure 4A:
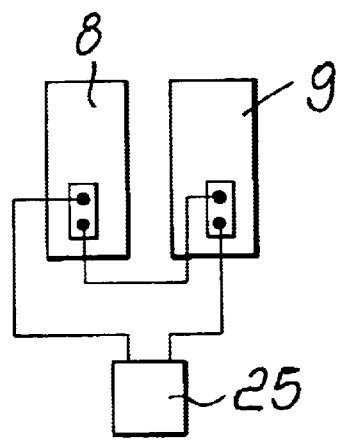
FIGS. 4a–4c are block diagrams of the electric power supply of the travel motor drive assembly of the vehicle with two electric motors in various planned coupling options.
Figure 4B:
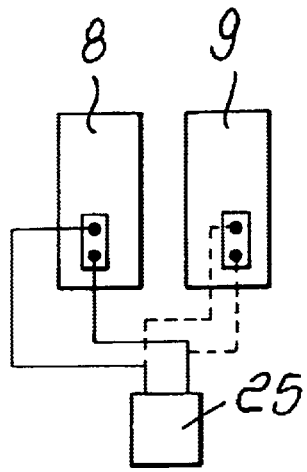
Figure 4C:
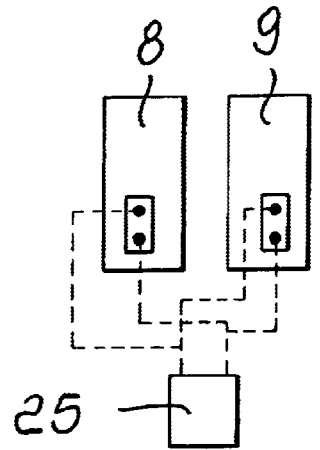
Figure 5:
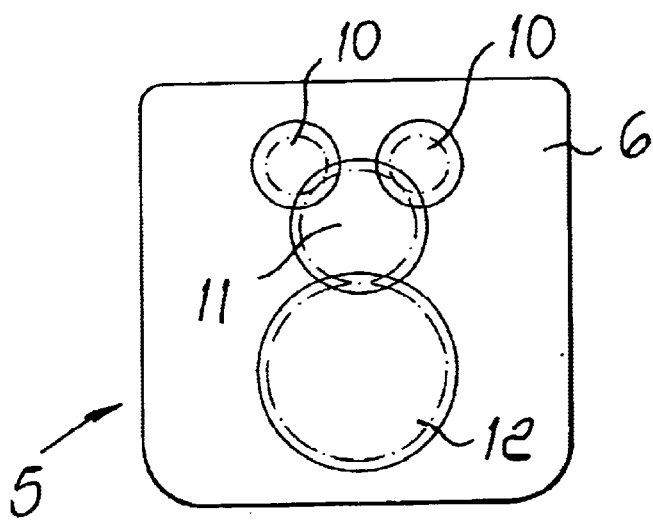
FIG. 5 is a front view of a gear-type distribution and reduction unit of the power plant.

With particular reference to the above figures, the reference numeral 1 generally designates a power plant for electric earth-moving and agricultural vehicles with four-wheel drive according to the invention, whose usual direction of forward travel has been designated by the arrow A.

The power plant 1 comprises a supporting chassis 2, an electric motor drive 3 for driving wheels of the vehicle, and an assembly 4 for the oscillating support of the front axle of the vehicle which is fixed, in a downward region, to the front end of the supporting chassis.

The motor drive 3 comprises a gear-type reduction and distribution unit 5 which is installed in a housing 6 which is rigidly coupled to the chassis: the reference numerals 8 and 9 designate two electric motors whose bodies are fixed to the housing 6: the horizontal output shafts of the motors 8 and 9 support respective toothed sprockets 10 which, optionally by means of an interposed idler gear 11, drive a gear 12 which is keyed onto a front longitudinal distribution shaft 14 and onto a rear longitudinal distribution shaft 13, both of the shafts protruding from the housing.

The shafts 13 and 14 can be either a single rigid shaft whose two ends protrude from the housing or two separate shafts which are mutually connected by a differential of the self-locking or manually lockable type for road travel.

Two differentials 15 and 16 are installed at the respective ends of the two shafts 13 and 14, and a front axle 17 and a rear axle 18 protrude respectively from the differentials 14,13 and are meant for respective pairs of hubs and respective driving wheels 19a, 19b and 20a, 20b. At least one of the axles is provided with steering elements: in the particular case shown, both axles have respective conventional steering elements 21 and 22.

Advantageously, in the supporting chassis 2, in a median and lower position, there is a transversely open tunnel 24 for installing a set of batteries B.

The tunnel 24 forms a box-like compartment which can be a single through compartment or can be constituted by a pair of compartment sections separated by a duct for the passage of the front distribution shaft.

Conveniently, the chassis is provided with additional compartments for arranging a second set of batteries, for example above the front wheels.

As shown above, there are two electric motors 8 and 9 for the driving wheels which are connected by means of the distribution and reduction unit to the distribution shafts 13 and 14 and can be connected, by means of a control unit 25, to the set of batteries B in series or individually or in parallel, in order to be able to provide incrementally higher speeds: advantageously, the shafts 13 and 14 have, at their ends, respective universal joints 26a, 26b, 27a and 27b.

In another embodiment there are four electric motors: two are associated with a front distribution and reduction unit and two are associated with a rear distribution and reduction unit.

The battery sets B are of the type known as gel or absorbed-acid batteries, and are adapted to operate even with high inclinations and under intense mechanical stress.

A disk 28 is fixed at right angles to one of the distribution shafts, particularly to the front one, and is adapted to be braked by two braking shoes 29a and 29b.

Advantageously, the vehicle is provided with a platform 30 on which an electricity-generating unit can be carried in order to recharge the battery sets: the unit can be deposited in an area where it can operate without causing pollution problems and can be connected, even by means of a long cable, to the vehicle in order to recharge the batteries during operation.

The power plant for electric earth-moving and agricultural vehicles with four-wheel drive according to the invention is capable of covering even long stretches on roads, since the travel motors can be supplied by any one of the battery sets so as to increase speed or range according to requirements; moreover, it can operate without emitting toxic gases and can be fitted with equipment of any kind which can be actuated hydraulically.

It has thus been shown that the invention achieves the intended aim and object.

The invention thus conceived is susceptible of numerous modifications and variations, all of which are within the scope of the inventive concept.

All the details may furthermore be replaced with other technically equivalent ones.

In practice, the materials used, as well as the shapes and the dimensions, may be any according to requirements without thereby abandoning the scope of the protection of the appended claims.

What is claimed is:

1. A power plant for electric earth-moving vehicles with four wheel drive, comprising a supporting chassis, an electric motor drive for driving wheels of the vehicle, said motor drive comprising a gear-type reduction and distribution unit which is installed in a housing which is rigidly coupled to said chassis, a front longitudinal distribution shaft and a rear longitudinal distribution shaft which protrude from said housing, at least two electric traction motors whose body is fixed to said housing such that the two motors are connected to said distribution shafts, two differentials which are fitted at the ends of said distribution shafts and from which a front axle and a rear axle respectively protrude for respective pairs of said driving wheels, at least one of said axles being provided with steering elements; a supporting element for an oscillating support of said front axle which is fixed, in a downward region, to a front end of said supporting chassis; and a control unit for connecting in series or individually or in parallel said at least two electric traction motors to an electric power supply, in order to drive said distribution shafts and to provide four wheel drive at incrementally higher speeds, depending on whether said control unit connects said at least two electric traction motors in series or individually or in parallel to said electric power supply.

2. The power plant according to claim 1, wherein said electric motors are connected to said distribution shafts by means of said distribution and reduction unit and can be connected, by means of said control unit, to a set of batteries in series or individually or in parallel which constitute said electric power supply.

3. The power plant according to claim 1, wherein said front and rear longitudinal distribution shafts are a single rigid shaft whose two ends protrude from said housing.

4. The power plant according to claim 1, wherein said front and rear longitudinal distribution shafts are separate and are mutually connectable.

5. The power plant according to claim 1, wherein said supporting chassis has, in a median position and in a downward region, a transversely open tunnel for inserting a first set of batteries.

6. The power plant according to claim 5, wherein said supporting chassis has further compartments arranged substantially above the front wheels for a second set of batteries.

7. The power plant according to claim 6, wherein said first and second battery sets are of a type known as gel-cell or absorbed-acid batteries.

8. The power plant according to claim 1, wherein a disk is fixed at right angles to one of said distribution shafts and is adapted to be braked by a pair of braking shoes.

* * * * *